(12) United States Patent
Chen et al.

(10) Patent No.: US 12,325,292 B2
(45) Date of Patent: Jun. 10, 2025

(54) VEHICLE COVER

(71) Applicant: Easepal Enterprises Limited, Xiamen (CN)

(72) Inventors: Zhixiong Chen, Xiamen (CN); Bingxing Liao, Xiamen (CN)

(73) Assignee: Easepal Enterprises Limited, Xiamen (CN)

( * ) Notice: Subject to any disclaimer, the term of this patent is extended or adjusted under 35 U.S.C. 154(b) by 128 days.

(21) Appl. No.: 18/380,964

(22) Filed: Oct. 17, 2023

(65) Prior Publication Data
US 2024/0140183 A1 May 2, 2024

(30) Foreign Application Priority Data
Oct. 26, 2022 (CN) .......................... 202222826430.1

(51) Int. Cl.
*B60J 11/04* (2006.01)

(52) U.S. Cl.
CPC ..................................... *B60J 11/04* (2013.01)

(58) Field of Classification Search
CPC .................................. B60J 11/04; B60J 7/104
USPC ........................................................ 150/166
See application file for complete search history.

(56) References Cited

U.S. PATENT DOCUMENTS

| | | | | |
|---|---|---|---|---|
| 3,752,528 A * | 8/1973 | Barker | ...................... | B60P 3/34 |
| | | | | 296/104 |
| 5,299,849 A * | 4/1994 | Cook | ....................... | B60J 7/104 |
| | | | | 296/159 |
| 6,010,176 A * | 1/2000 | Jones | ....................... | B60J 7/104 |
| | | | | 105/377.02 |
| 9,381,797 B2 * | 7/2016 | Chen | ....................... | B60J 11/04 |
| 10,279,668 B2 * | 5/2019 | Staudt | ....................... | B60J 11/04 |
| 2022/0097508 A1 * | 3/2022 | Gervasi | ..................... | B60J 11/04 |
| 2024/0001747 A1 * | 1/2024 | Yerby, Jr. | ................. | B60J 11/04 |

FOREIGN PATENT DOCUMENTS

CN 110641265 A * 1/2020

* cited by examiner

*Primary Examiner* — Nathan J Jenness
*Assistant Examiner* — Justin Caudill
(74) *Attorney, Agent, or Firm* — Cooper Legal Group, LLC (57) ABSTRACT

A vehicle cover, the vehicle cover comprises a top cover, a front cover, a rear cover, side covers disposed on two sides of the top cover, and a plurality of brace rods. Tops of inner walls of the side covers comprise plug pockets in which ends of the plurality of brace rods are disposed, ends of the plug pockets away from the top cover are open, the inner walls of the side covers comprise sleeving tubes, the plurality of brace rods are disposed in the plug pockets after passing through the sleeving tubes, tow strips are disposed on the plug pockets, and the inner walls of the side covers comprise flexible pull rings used for pulling the vehicle cover by external objects.

10 Claims, 11 Drawing Sheets

VEHICLE COVER

RELATED APPLICATIONS

This application claims priority to Chinese patent application number 202222826430.1, filed on Oct. 26, 2022. Chinese patent application number 202222826430.1 is incorporated herein by reference.

FIELD OF THE DISCLOSURE

The present disclosure relates to the technical field of a vehicle cover, and in particular relates to a vehicle cover for quick installation.

BACKGROUND OF THE DISCLOSURE

Vehicle covers, also called vehicle outer covers, are covers made of cloth or other flexible wear-resistant materials according to shapes and dimensions of vehicles, and serve as protective equipment of the vehicles. The vehicle covers can protect vehicle paints and vehicle window glasses.

In the existing techniques, for caravans, in order to avoid dangers and troubles caused when installing the vehicle cover by climbing to a roof of the vehicles, a side wall in a length direction of the vehicle cover is usually rolled up, and ends of the vehicle cover are supported by brace rods. The vehicle cover then covers an outside of a vehicle body along a length direction of the vehicle body, and finally the rolled-up side wall is released to complete installation of the vehicle covers. However, a height, a length, and a size of the vehicle body of caravans are large, and a required size of the vehicle covers is also large and heavy. When the vehicle covers are supported, people need to drag the vehicle covers when walking. In a dragging process, the brace rods are unstable, people need to spend a lot of effort to apply force to the vehicle covers using the brace rods to drag the vehicle covers, and an installation process of the vehicle covers is time-consuming, laborious, cumbersome, and difficult.

BRIEF SUMMARY OF THE DISCLOSURE

The present disclosure provides a vehicle cover for quick installation to facilitate the installation of the vehicle cover.

A technical solution of the present disclosure is as follows.

A vehicle cover (e.g., vehicle cover for quick installation), the vehicle cover comprises a top cover, a front cover, a rear cover, side covers disposed on two sides of the top cover, and a plurality of brace rods. Tops of inner walls of the side covers comprise plug pockets in which ends of the plurality of brace rods are disposed, ends of the plug pockets away from the top cover are open, the inner walls of the side covers comprise sleeving tubes, the plurality of brace rods are disposed in the plug pockets after passing through the sleeving tubes, tow strips are disposed on the plug pockets, and the inner walls of the side covers comprise pull rings used for pulling the vehicle cover by external objects.

In a preferred embodiment, at least one of the plurality of brace rods comprises at least two segmental rods, two adjacent segmental rods of the at least two segmental rods are detachably connected by a connecting piece, the connecting piece comprises a stopping column and a stopping hole, an end of a first segmental rod of the two adjacent segmental rods coaxially comprises a plug column, a second segmental rod of the two adjacent segmental rods comprises a plug hole in which the plug column is disposed, the stopping hole perpendicular to an axial direction of the second segmental rod is disposed on a side wall of the second segmental rod and is in communication with the plug hole, the stopping column is telescopically disposed in the plug column, an axial direction of the stopping column is perpendicular to the plug column, a driving spring is disposed in the plug column to drive the stopping column to extend out of the plug column, and the stopping column is configured to be disposed in the stopping hole to maintain a connection of the two adjacent segmental rods.

In a preferred embodiment, first ends of the plurality of brace rods detachably comprise top pins, edges of the side covers and the rear cover comprise pin holes, the top pins penetrate the pin holes, and first ends of the plurality of brace rods abut edges of the pin holes.

In a preferred embodiment, first ends of the plurality of brace rods detachably comprise pull hooks used to hook and pull the pull rings.

In a preferred embodiment, strip rings are disposed on two sides of the side covers disposed on two sides of the vehicle cover at intervals, the vehicle cover comprises a plurality of wind resistant webbings, the plurality of wind resistant webbings are longitudinally or laterally wrapped on the vehicle cover respectively, the plurality of wind resistant webbings correspondingly penetrate the strip rings, and the plurality of wind resistant webbings are disposed at intervals along a length direction of the vehicle cover.

In a preferred embodiment, at least one of the side covers comprises three separating side covers connected side by side, two adjacent segmental covers of the three separating side covers are connected by a first zipper, a first separating side cover of the three separating side covers adjacent to the rear cover is connected to the rear cover by a second zipper, and a second separating side cover of the three separating side covers adjacent to the front cover is connected to the front cover by a third zipper.

In a preferred embodiment, a connection between the three separating side covers and the top cover comprises reinforcing hook and loop fasteners.

In a preferred embodiment, the side covers comprises two sets of the three separating side covers, first female and male buckles are disposed between two opposite separating side covers of the two sets of three separating side covers, and female buckles and male buckles of the first female and male buckles are respectively connected to the two opposite separating side covers through nylon strips.

In a preferred embodiment, all of the top cover, the front cover, and the rear cover comprise second female and male buckles, and male buckles and female buckles of the second female and male buckles are respectively connected to two ends of a corresponding one of the top cover, the front cover, and the rear cover through nylon strips along a width direction of a vehicle body using the vehicle cover.

In a preferred embodiment, hook and loop fasteners are disposed along an outer wall of an edge of the top cover at intervals, binding strips are correspondingly disposed along an inner wall of the edge of the top cover, the hook and loop fasteners are disposed on the binding strips, and the rear cover or the side covers being rolled up are bound using the binding strips and stuck with the hook and loop fasteners.

Therefore, the present disclosure has the following advantages.

1. The plurality of brace rods are disposed in the plug pockets after passing through the sleeving tubes, so that the plurality of brace rods fit stably on the three separating side covers and are more stable when the plurality of brace rods are lifted up. The tow strips can be pulled to enable the vehicle cover to move towards a traction direction. An arrangement of the pull rings can pull the entire vehicle cover with an external object, such as by binding the pull rings using the pull ropes or hooking the pull rings using the pull hooks, so that the vehicle cover can more easily cover the vehicle body, and the operation is labor-saving, convenient, and quick;

2. At least one of the plurality of brace rods comprises multiple segmental rods and is detachably connected through the connecting piece to enable the at least one of the plurality of brace rods to save storage space after disassembly. The top pins can be detachably connected to the ends of the plurality of brace rods to cooperate with the pin holes at the edges of the three separating side covers. The plurality of brace rods are disposed on the ground, and the top pins are disposed in the pin holes, so that the three separating side covers can be lifted up to form a shelter. The ends of the plurality of brace rods can be detachably connected to the pull hooks, and the pull hooks can be used to hook the pull rings to tow the vehicle cover for easy operation;

3. The cooperation of the wind resistant webbings and the strip rings can avoid the bulge phenomenon of the vehicle cover caused by the wind and play the role of fixing the vehicle cover;

4. The connection portion between the three separating side covers and the top cover can be supplemented with reinforcing hook and loop fasteners to enable the connection portion to be more stable and not easily cracked.

DETAILED DESCRIPTION OF THE EMBODIMENTS

The present disclosure will be further described below in combination with the accompanying drawings.

Embodiment 1

Embodiment 1 of the present disclosure discloses a vehicle cover (i.e., a vehicle cover for quick installation). The vehicle cover comprises a top cover 1, a front cover 2, a rear cover 3, side covers 40 disposed on two sides of the top cover 1 in a width direction of the top cover 1, and a plurality of brace rods 5. The top cover 1, the front cover 2, the rear cover 3, and the side covers 40 form a cuboid structure with an opening facing downward, and edges of the front cover 2, the rear cover 3, and the side covers 40 adjacent to the top cover 1 are sewn to the top cover 1. Each of the side covers 40 comprises three separating side covers 4 connected side by side along a length direction of the top cover 1, and two adjacent separating side covers of the three separating side covers 4 are connected by a first zipper. A first separating side cover of the three separating side covers 4 adjacent to the rear cover 3 is connected to the rear cover 3 by a second zipper, and a second separating side cover of the three separating side covers 4 adjacent to the front cover 2 is connected to the front cover 2 by a third zipper.

Figure 5:
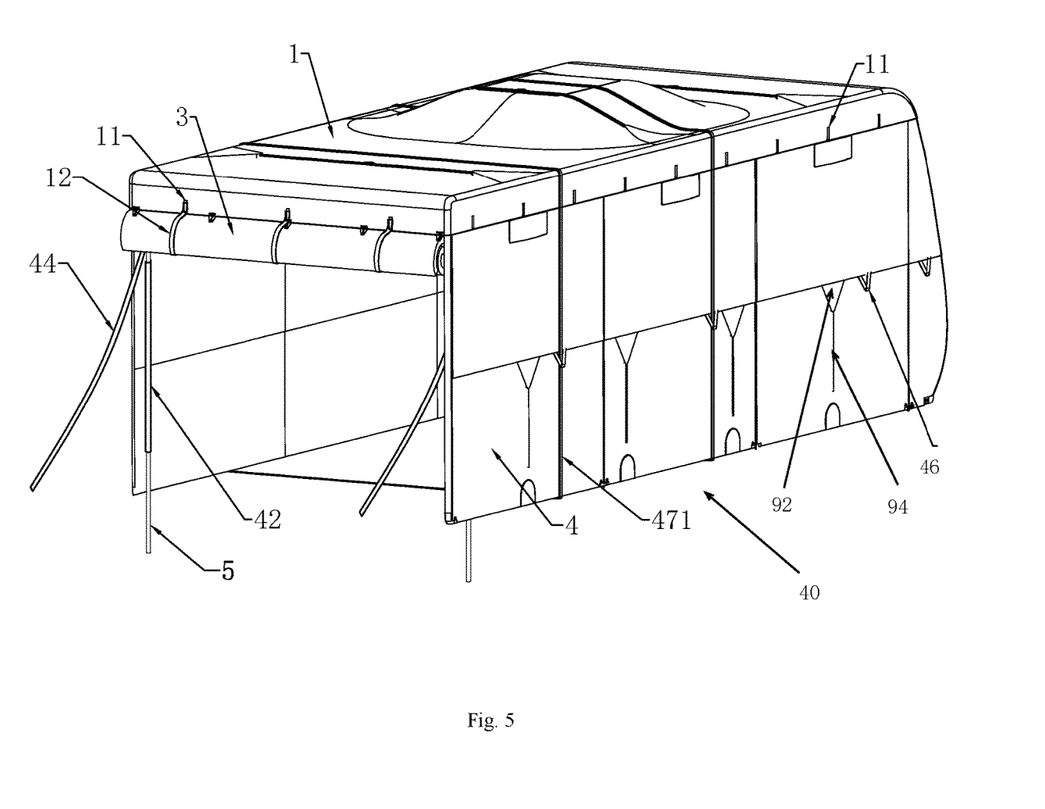
FIG. 5 illustrates a state in which a brace rod is disposed in a plug pocket after a rear cover is rolled up in Embodiment 1.
Figure 11:
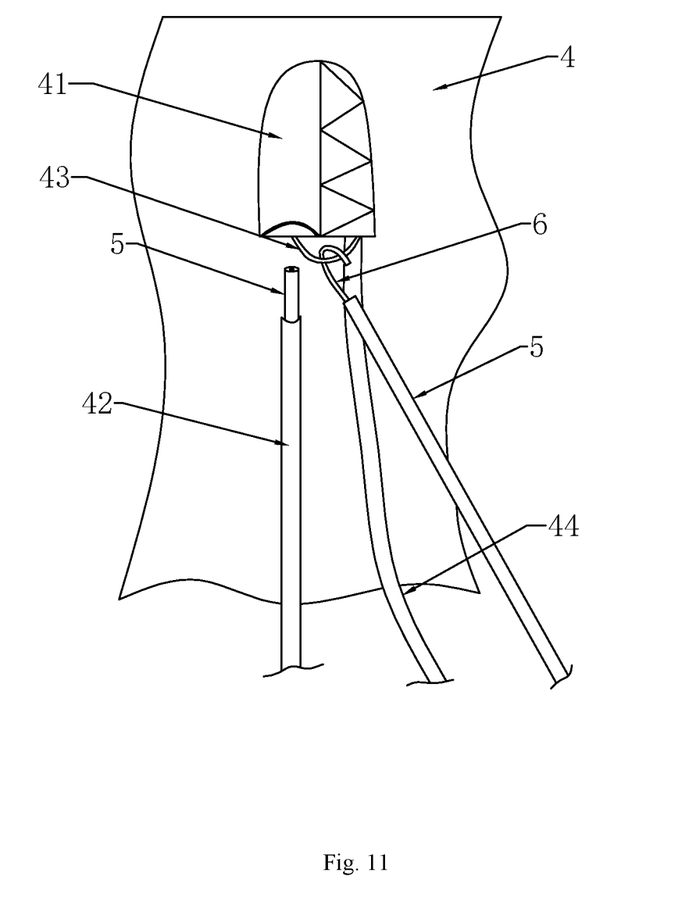
FIG. 11 illustrates a view of the plug pocket, the brace rod, a sleeving tube, and a tow strip in Embodiment 1.

Specifically, tops of inner walls of the side covers 40 comprise plug pockets 41. In this embodiment, a plug pocket 41 of the plug pockets 41 is sewn to a top of an inner wall of each of the three separating side covers 4. An opening of an end of the plug pocket 41 away from the top cover 1 faces downward. Sleeving tubes 42 made of cloth are sewn to inner walls of the three separating side covers 4, the plurality of brace rods 5 pass through the sleeving tubes 42, and ends of the plurality of brace rods 5 are disposed in the plug pockets 41, so that the plurality of brace rods 5 can brace the vehicle cover to enable a connection between the plurality of brace rods 5 and the three separating side covers 4 to be stable, not easily shaken, and easily operated.

Figure 8:
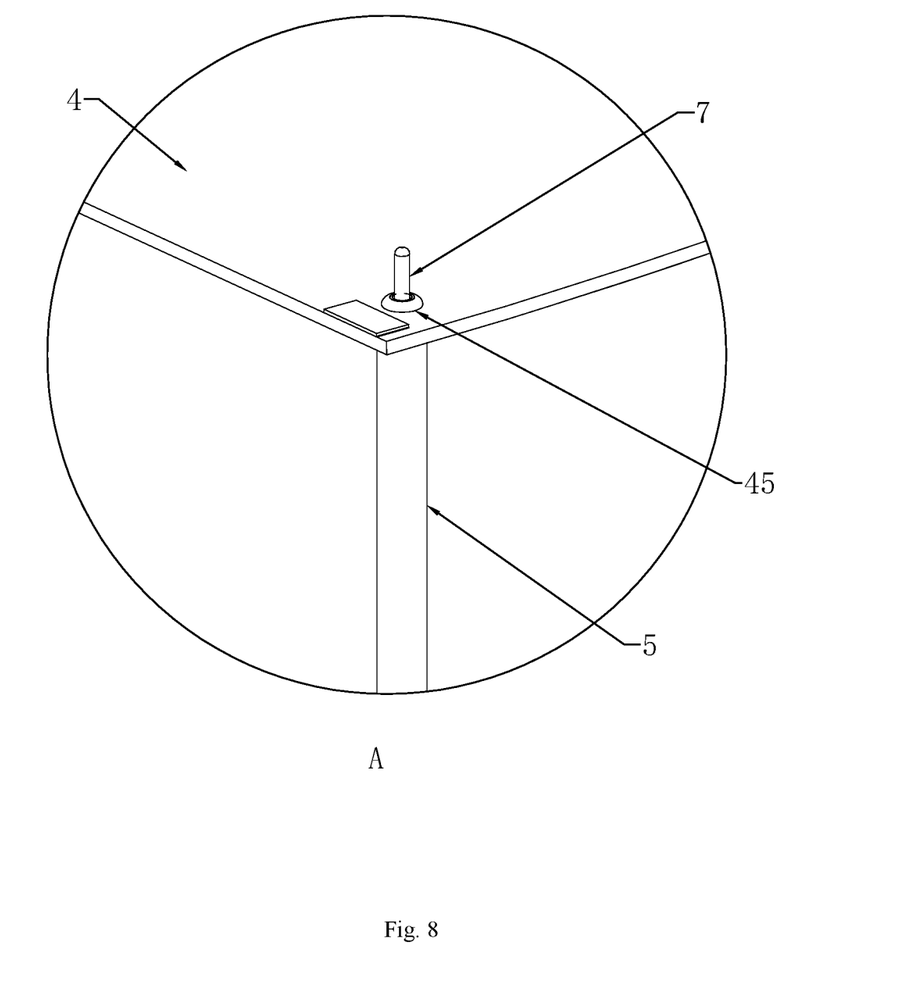
FIG. 8 illustrates an enlarged view of a portion A in FIG. 7.

Furthermore, pull rings 43 made of a flexible material, such as nylon, are sewn to the inner walls of the three separating side covers 4. The pull rings 43 are sewn to edges of the plug pockets 41. The pull rings 43 can be set as follows due to a large size and a large weight of the vehicle cover. The pull rings 43 can be bound with an external object, such as pull ropes, or the pull ring 43 can be pulled using pull rods, and the pull rings 43 are forced to pull the entire vehicle cover to move to save effort and facilitate operations. In addition, first sides of the plug pockets 41 are connected to tow strips 44 by sewing, and first ends of the tow strips 44 away from the plug pockets 41 drops freely. After the plurality of brace rods 5 are disposed in the plug pockets 41, the tow strips 44 can be pulled using one hand of the operator to assist the plurality of brace rods 5 and to tow the vehicle cover to move. First ends of the plurality of brace rods 5 can also comprise pull hooks 6, and the pull hooks 6 are connected to the first ends of the plurality of brace rods 5 through screw threads to hook the pull rings 43 through the pull hooks 6.

Figure 10:
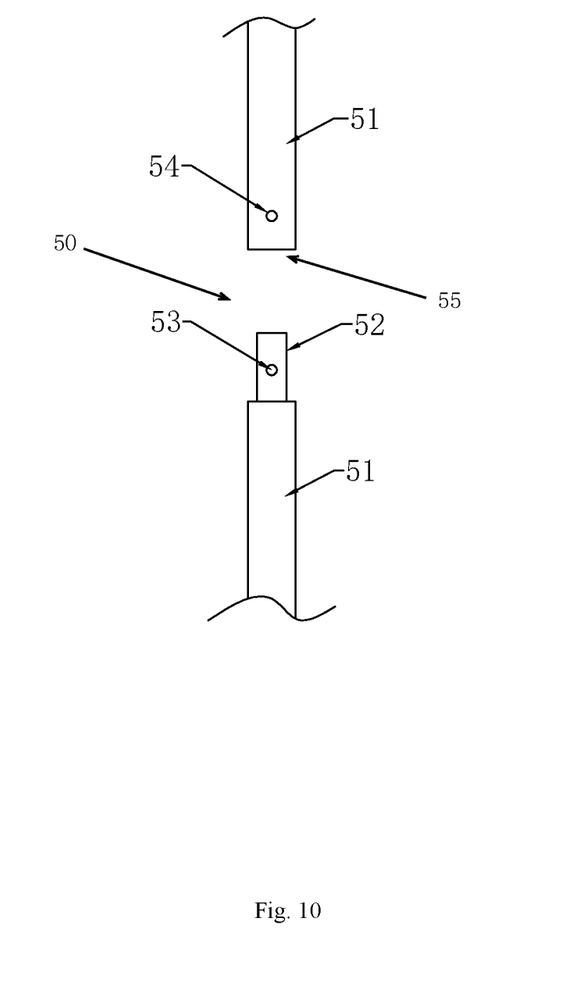
FIG. 10 illustrates a view of two adjacent segmental rods in Embodiment 1.

At least one of the plurality of brace rods 5 comprises at least two segmental rods 51, and two adjacent segmental rods 51 of the at least two segmental rods 51 can be detachably connected through a connecting piece 50, so as to reduce a storage space of the plurality of brace rods 5 after disassembly. Specifically, the connecting piece 50 comprises a stopping column 53 and a stopping hole 54. In the two adjacent segmental rods 51, an end of a first segmental rod 51 coaxially comprises a plug column 52, and a second segmental rod 51 comprises a plug hole 55 in which the plug column 52 is disposed. The stopping hole 54 perpendicular to an axial direction of the second segmental rod 51 is disposed on a side wall of the second segmental rod 51 and is in communication with the plug hole 55. The stopping column 53 is telescopically disposed in the plug column 52. An axial direction of the stopping column 53 is perpendicular to the plug column 52, and a driving spring is disposed in the plug column 52 to drive the stopping column 53 to extend out of the plug column 52. The stopping column 53 is used to be disposed in the stopping hole 54 to maintain a connection of the two adjacent segmental rods 51. The at least one of the plurality of brace rods 5 can be quickly spliced or disassembled through a setting of the stopping column 53 and the stopping hole 54.

Figure 6:
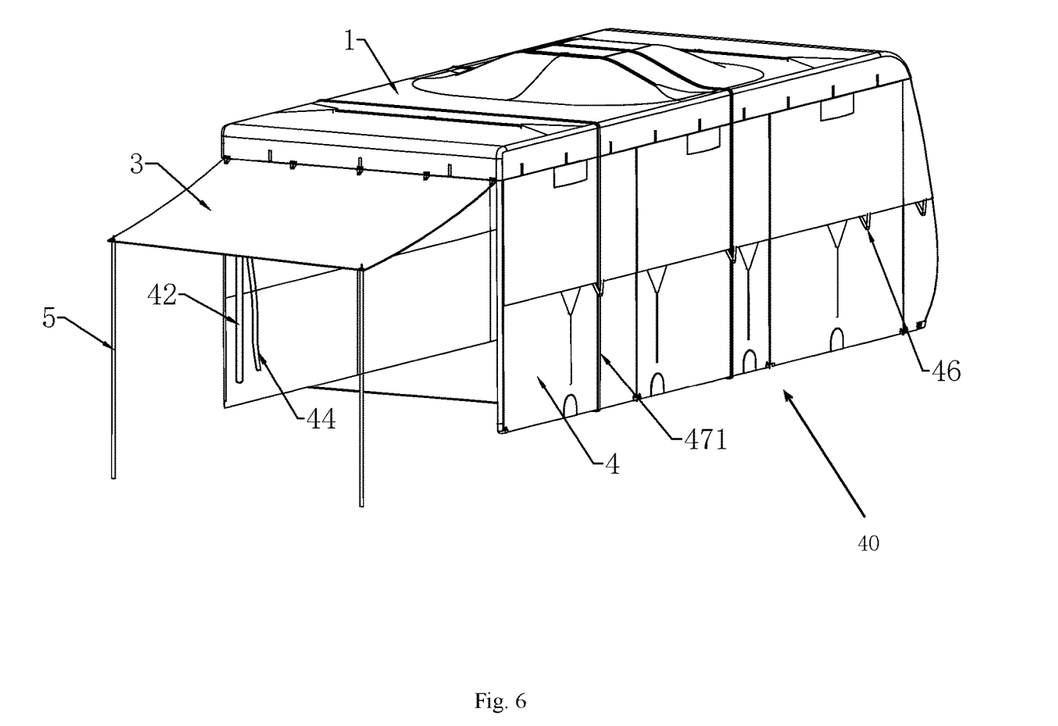
FIG. 6 illustrates a view after the rear cover is lifted to open and braced in Embodiment 1.
Figure 7:
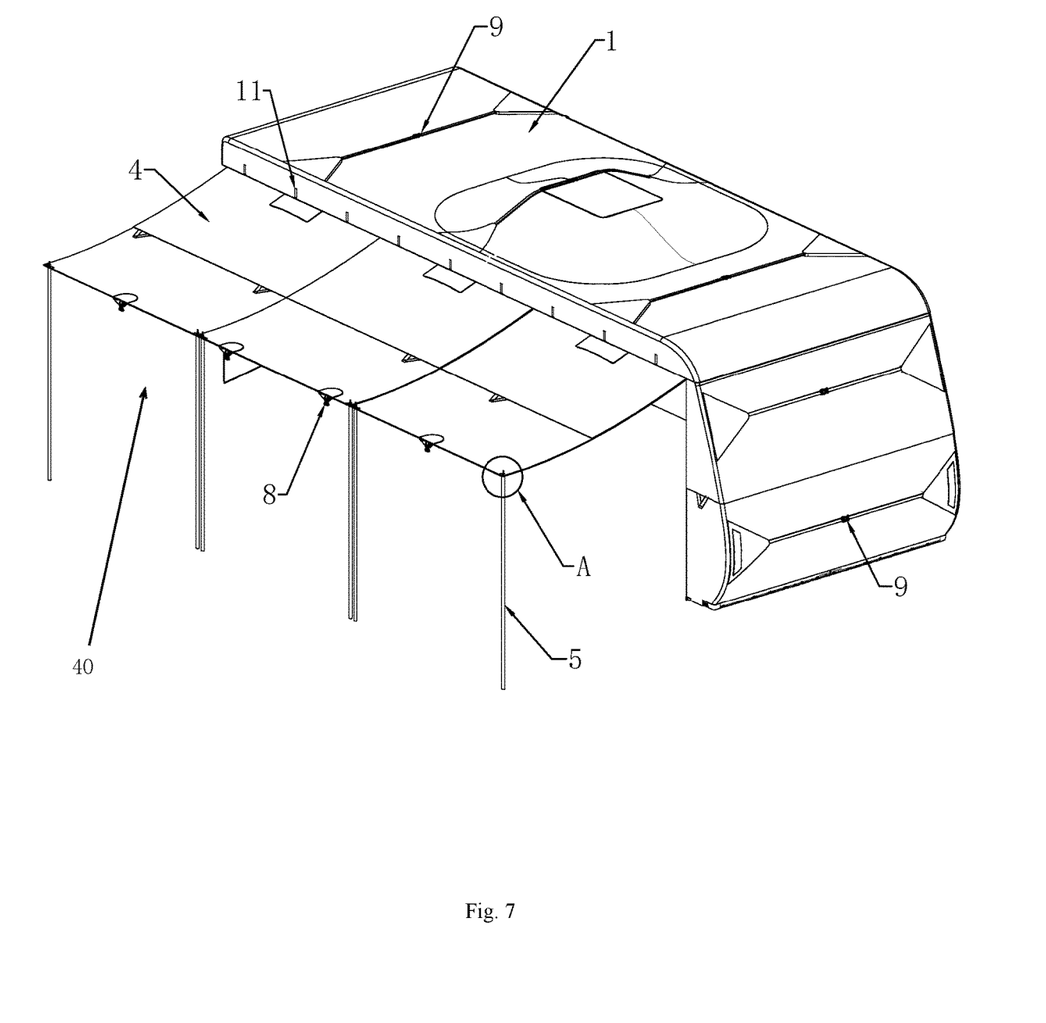
FIG. 7 illustrates a view after three separating side covers on a side of the vehicle cover is lifted to open and braced in Embodiment 1.
Figure 9:
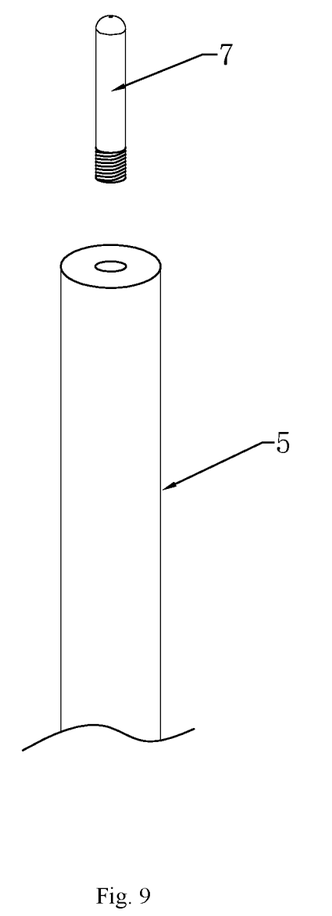
FIG. 9 illustrates a view of a top pin and the brace rod in Embodiment 1.

Furthermore, a top pin 7 can be detachably disposed on a first end of the at least one of the plurality of brace rods 5, and the top pin 7 can be threaded to the second segmental rod 51 and be coaxially connected to the second segmental rod 51. An edge of each of the side covers 40 and the rear cover 3 comprise a pin hole 45, the top pin 7 penetrates the pin hole 45, and a first end of the second segmental rod 51 abuts an edge of the pin hole 45. When at least one of the three separating side covers 4 or the rear cover 3 is lifted to open, the top pin 7 is disposed in the pin hole 45, the first end of the at least one of the plurality of brace rods 5 is connected to the edge of the pin hole 45 of the at least one of the three separating side covers 4, and the at least one of the plurality of brace rods 5 is vertically plugged on the ground to enable the at least one of the three separating side covers 4 or the rear cover 3 to form a shelter. It should be noted that the top pin 7 should be removed to prevent the top pin 7 from puncturing a corresponding one of the plug pockets 41 due to an overly thin shape of the top pin 7 before the at least one of the plurality of brace rods 5 is disposed in the corresponding one of the plug pocket 41.

Figure 4:
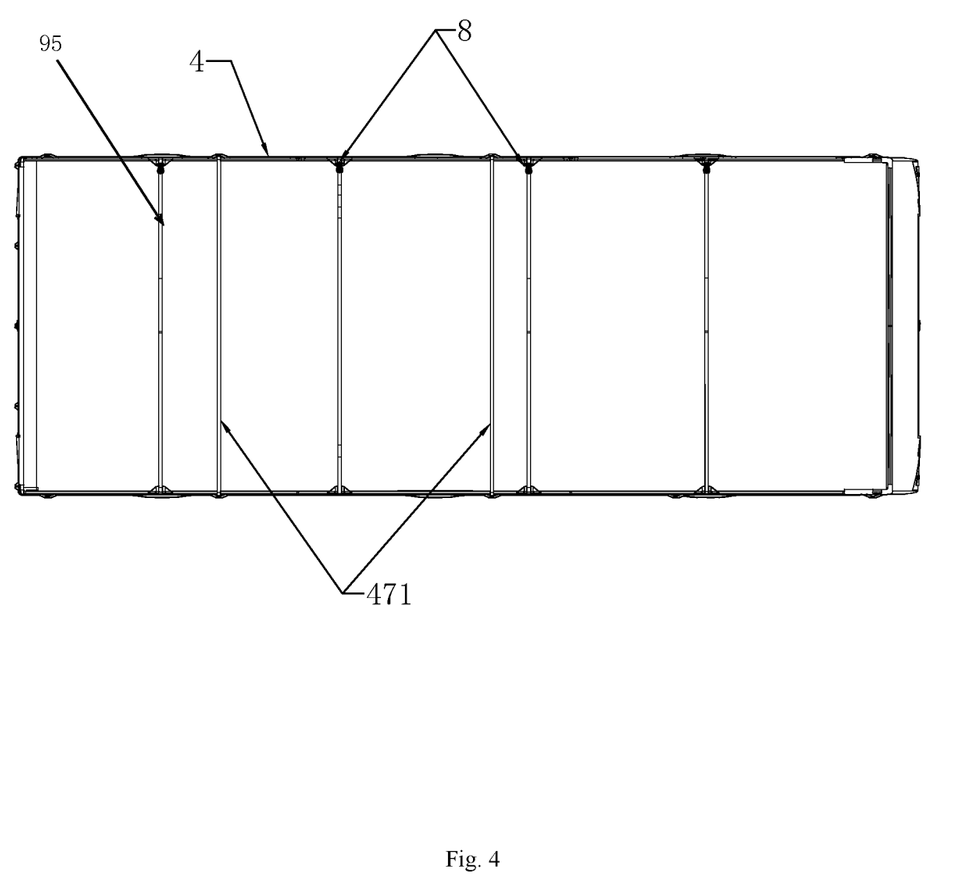
FIG. 4 illustrates a bottom view of the vehicle cover in Embodiment 1.

First ones of hook and loop fasteners 11 are disposed at intervals along an outer wall of an edge of the top cover 1, binding strips 12 are sewn to an inner wall of the edge of the top cover 1, and the binding strips 12 comprises second ones of the hook and loop fasteners 11. After the rear cover 3 or the three separating side covers 4 are rolled up, the binding strips 12 are correspondingly wrapped around the rear cover 3 or the three separating side covers 4 and then stuck using the hook and loop fasteners 11 to be maintained in a rolled-up state. In other embodiments, the binding strips 12 can also be correspondingly disposed on an inner wall of the rear cover 3 or the three separating side covers 4.

First female and male buckles 8 are disposed between two opposite separating side covers 4 of two sets of the three separating side covers 4. First male buckles and first female buckles of the first female and male buckles 8 are respectively connected to the two opposite separating side covers 4 through first nylon strips 95, and the first nylon strips 95 are connected to inner walls of the two opposite separating side covers 4 through dome-shaped blocks 81. After the vehicle cover covers an entire vehicle body, bottoms of the two opposite separating side covers 4 are connected through the first female and male buckles 8 to maintain stability between the vehicle cover and the vehicle body. A connection between the three separating side covers 4 and the top cover 1 also comprises reinforcing hook and loop fasteners 13 to improve a connection strength of the three separating side covers 4 and the top cover 1. Upper ends of the three separating side covers 4 comprise holes, and the holes are sewn through gauze. An outside of the gauze is sewn to ventilation cloth covers 48, and lower ends of the ventilation cloth covers 48 comprise holes to form ventilation windows to avoid condensation water in the vehicle cover.

Figure 1:
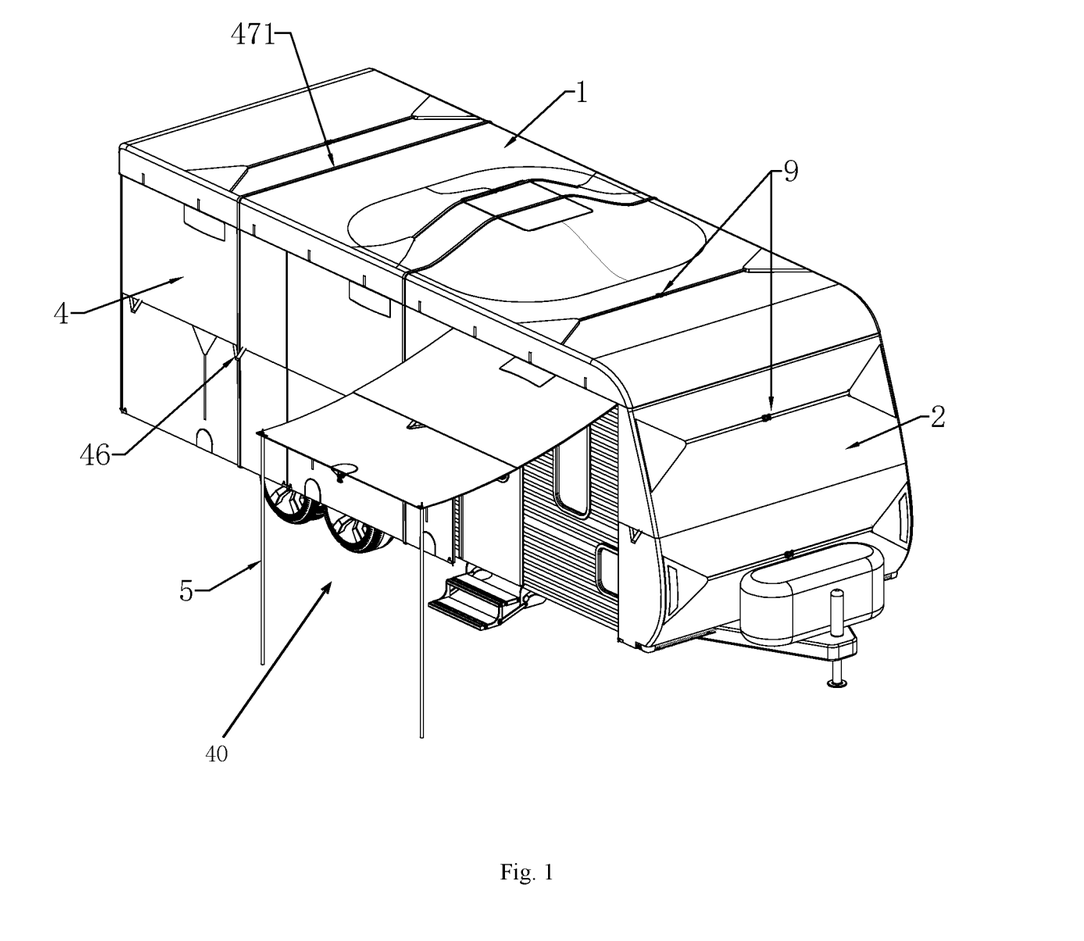
FIG. 1 illustrates a view after a separating side cover is lifted to open and braced in Embodiment 1 of the present disclosure.
Figure 2:
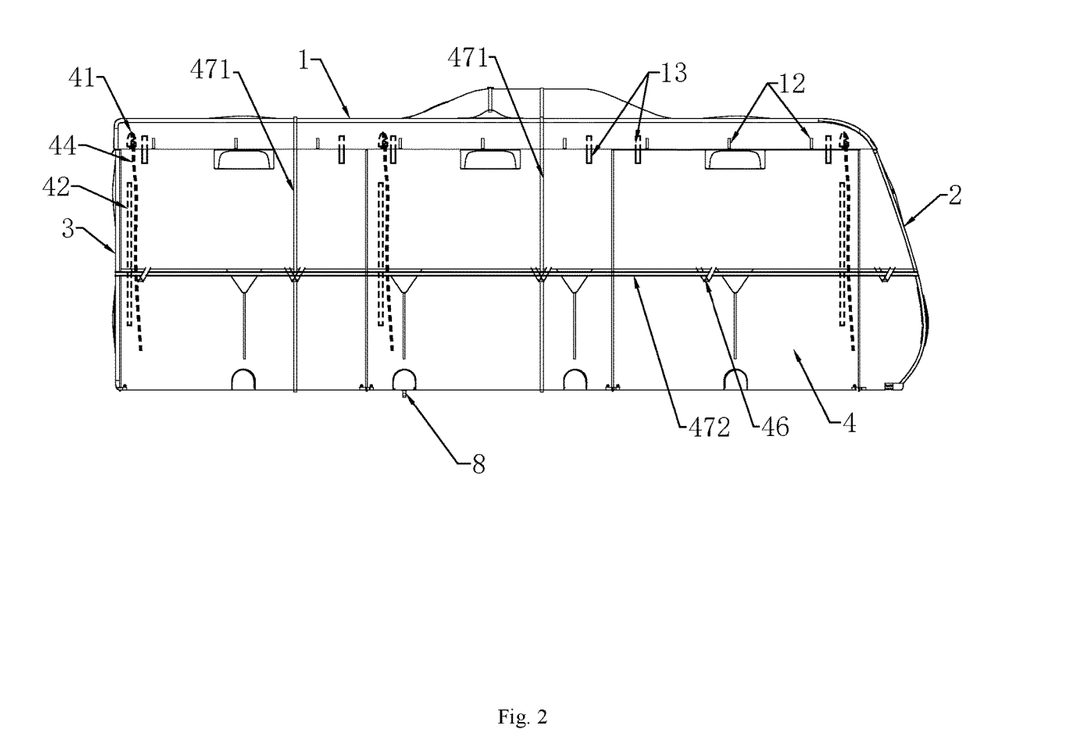
FIG. 2 illustrates a side view of a vehicle cover in Embodiment 1.
Figure 3:
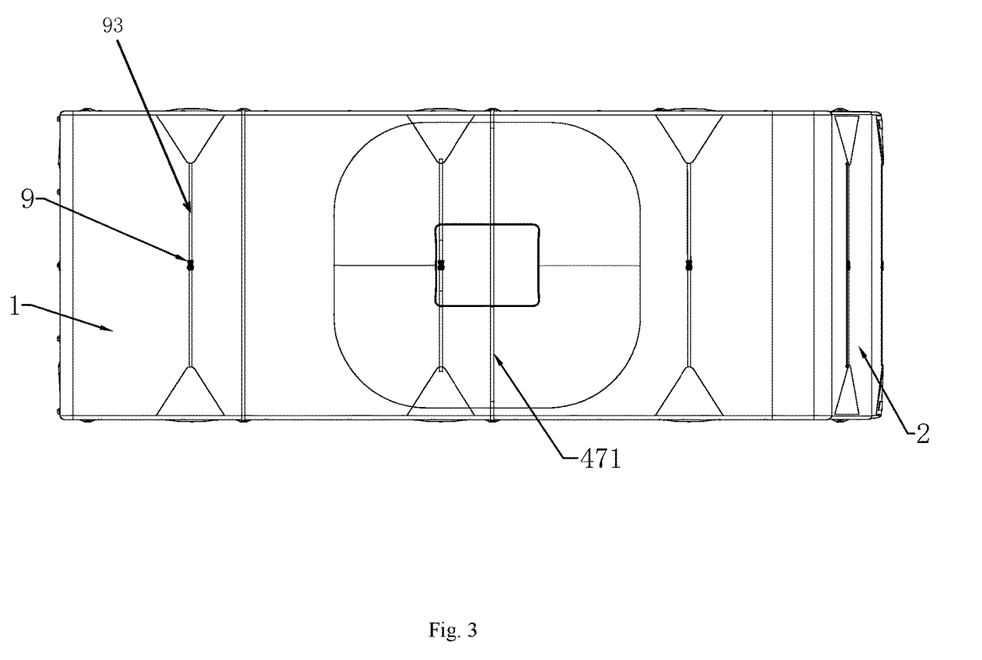
FIG. 3 illustrates a top view of the vehicle cover in Embodiment 1.

In addition, second female and male buckles 9 are disposed on all of an outer wall of the top cover 1, an outer wall of the front cover 2, and an outer wall of the rear cover 3 at intervals. Second female buckles and second male buckles of the second female and male buckle 9 are respectively correspondingly connected to two ends of the top cover 1, the front cover 2, and the rear cover 3 along the width direction of the vehicle body through second nylon strips 93 to improve tensile strength. In addition, a width of the entire vehicle cover is adjusted through an adjustment between the second nylon strips 93 and the second female and male buckles 9. Ends of the second nylon strips 93 away from the second female and male buckles 9 are connected to the vehicle cover through first triangle blocks 91 shaped as isosceles triangles, bottom edges of the first triangle blocks 91 are connected to the vehicle cover, and corners opposite to the bottom edges are connected to the second nylon strips 93. When the second nylon strips 93 are pulled by tensional forces, the tensional forces can be dispersed to the first triangle blocks 91 and then transferred to the vehicle cover due to an arrangement of the first triangle blocks 91, so as to improve the tensile strength. In other embodiments, outer walls of the three separating side covers 4 can also be connected to second triangle blocks 92, and third nylon strips 94 are connected to lower sharp corners of the second triangle blocks 92. The two opposite separating side covers 4 are connected through buckles at ends of the third nylon strips 94.

Furthermore, strip rings 46 are disposed on the two sets of the three separating side covers 4 on both sides of the vehicle cover, and the vehicle cover comprises a plurality of first wind resistant webbings 471. The plurality of first wind resistant webbings 471 are laterally wrapped around the vehicle cover to pass through the strip rings 46 of the two sets of the three separating side covers 4. Second wind resistant webbing 472 is respectively longitudinally wrapped around the vehicle cover, is disposed at intervals along a length direction of the vehicle cover, and passes through corresponding ones of the strip rings 46. Two ends of the plurality of first wind resistant webbings 471 or the second wind resistant webbing 472 can be mutually fixed by directly tying or buckles. The plurality of first wind resistant webbings 471, the second wind resistant webbing 472, and the strip rings 46 cooperate in a crisscross pattern to prevent the vehicle cover from creating a bulge phenomenon due to wind blowing into the vehicle cover to play a role in fixing the vehicle cover.

When the vehicle cover is installed, the rear cover 3 is rolled up and bound with the binding strips 12 to enable the rear cover 3 to maintain a rolled-up state. The plurality of brace rods 5 pass through the sleeving tubes 42 of the first separating side cover and the second separating side cover of the two sides of the three separating side covers 4 and are correspondingly disposed in the plug pockets 41. Operators at both sides can simultaneously pull the tow strips 44 to move from a front portion of the vehicle body to a rear portion of the vehicle body. In addition, pull ropes can be bound to the pull rings 43 for towing the vehicle cover, or the pull hooks 6 on ends of the plurality of brace rods 5 hook the pull rings 43 for towing the vehicle cover, so that the vehicle cover can be easily installed on the vehicle body. The rear cover 3 is then lowered down, and the rear cover 3 is connect to the side covers 40 through the second zipper.

The aforementioned embodiments are merely some embodiments of the present disclosure, and the scope of the disclosure is not limited thereto. Thus, it is intended that the present disclosure cover any modifications and variations of the presently presented embodiments provided they are

What is claimed is:

1. A vehicle cover, comprising:
a top cover,
a front cover,
a rear cover,
side covers disposed on two sides of the top cover, and
a plurality of brace rods, wherein:
   tops of inner walls of the side covers comprise plug pockets in which ends of the plurality of brace rods are disposed,
   ends of the plug pockets away from the top cover are open,
   the inner walls of the side covers comprise sleeving tubes,
   the plurality of brace rods are disposed in the plug pockets after passing through the sleeving tubes,
   tow strips are disposed on the plug pockets, and
   the inner walls of the side covers comprise pull rings used for pulling the vehicle cover by external objects.

2. The vehicle cover according to claim 1, wherein:
at least one of the plurality of brace rods comprises at least two segmental rods,
two adjacent segmental rods of the at least two segmental rods are detachably connected by a connecting piece,
the connecting piece comprises a stopping column and a stopping hole,
an end of a first segmental rod of the two adjacent segmental rods coaxially comprises a plug column,
a second segmental rod of the two adjacent segmental rods comprises a plug hole in which the plug column is disposed,
the stopping hole perpendicular to an axial direction of the second segmental rod is disposed on a side wall of the second segmental rod and is in communication with the plug hole,
the stopping column is telescopically disposed in the plug column,
an axial direction of the stopping column is perpendicular to the plug column,
a driving spring is disposed in the plug column to drive the stopping column to extend out of the plug column, and
the stopping column is configured to be disposed in the stopping hole to maintain a connection of the two adjacent segmental rods.

3. The vehicle cover according to claim 1, wherein:
first ends of the plurality of brace rods detachably comprise top pins,
edges of the side covers and the rear cover comprise pin holes,
the top pins penetrate the pin holes, and
first ends of the plurality of brace rods abut edges of the pin holes.

4. The vehicle cover according to claim 1, wherein first ends of the plurality of brace rods detachably comprise pull hooks used to hook and pull the pull rings.

5. The vehicle cover according to claim 1, wherein:
strip rings are disposed on the side covers disposed on two sides of the vehicle cover at intervals,
the vehicle cover comprises a plurality of wind resistant webbings,
the plurality of wind resistant webbings are longitudinally or laterally wrapped on the vehicle cover respectively,
the plurality of wind resistant webbings correspondingly penetrate the strip rings, and
the plurality of wind resistant webbings are disposed at intervals along a length direction of the vehicle cover.

6. The vehicle cover according to claim 1, wherein:
at least one of the side covers comprises three separating side covers connected side by side,
two adjacent segmental covers of the three separating side covers are connected by a first zipper,
a first separating side cover of the three separating side covers adjacent to the rear cover is connected to the rear cover by a second zipper, and
a second separating side cover of the three separating side covers adjacent to the front cover is connected to the front cover by a third zipper.

7. The vehicle cover according to claim 6, wherein a connection between the three separating side covers and the top cover comprises reinforcing hook and loop fasteners.

8. The vehicle cover according to claim 6, wherein:
the side covers comprises two sets of the three separating side covers,
first female and male buckles are disposed between two opposite separating side covers of the two sets of three separating side covers, and
female buckles and male buckles of the first female and male buckles are respectively connected to the two opposite separating side covers through nylon strips.

9. The vehicle cover according to claim 1, wherein:
all of the top cover, the front cover, and the rear cover comprise second female and male buckles, and
male buckles and female buckles of the second female and male buckles are respectively connected to two ends of a corresponding one of the top cover, the front cover, and the rear cover through nylon strips along a width direction of a vehicle body using the vehicle cover.

10. The vehicle cover according to claim 1, wherein:
hook and loop fasteners are disposed along an outer wall of an edge of the top cover at intervals,
binding strips are correspondingly disposed along an inner wall of the edge of the top cover,
the hook and loop fasteners are disposed on the binding strips, and
the rear cover or the side covers being rolled up are bound using the binding strips and stuck with the hook and loop fasteners.

* * * * *